(12) United States Patent
Hirasako et al.

(10) Patent No.: US 8,290,668 B2
(45) Date of Patent: Oct. 16, 2012

(54) CONTROL APPARATUS AND METHOD FOR AUTOMATIC TRANSMISSION

(75) Inventors: Kazuki Hirasako, Tokyo (JP); Masami Suzuki, Mishima (JP)

(73) Assignee: Jatco Ltd, Fuji-shi (JP)

( * ) Notice: Subject to any disclaimer, the term of this patent is extended or adjusted under 35 U.S.C. 154(b) by 331 days.

(21) Appl. No.: 12/649,894

(22) Filed: Dec. 30, 2009

(65) Prior Publication Data

US 2010/0250074 A1   Sep. 30, 2010

(30) Foreign Application Priority Data

Mar. 25, 2009 (JP) .................................. 2009-074081

(51) Int. Cl.
*G06F 7/00* (2006.01)
(52) U.S. Cl. ................ 701/51; 701/53; 701/55; 701/56; 701/58; 701/67
(58) Field of Classification Search .............. 701/51–65, 701/67–68

See application file for complete search history.

(56) References Cited

U.S. PATENT DOCUMENTS 7,503,873 B2   3/2009   Nakajima et al.

*Primary Examiner* — Khoi Tran
*Assistant Examiner* — Bhavesh V Amin
(74) *Attorney, Agent, or Firm* — Foley & Lardner LLP

(57) ABSTRACT

A control apparatus includes a shift-pressure learning correction controlling section configured to perform a shift-pressure learning correction in which a physical quantity representing a progress of shift is measured at a time of a current downshift, and in which an engagement command pressure for a friction element is corrected at a time of a next downshift on the basis of a divergence between the measured physical quantity and a target physical quantity; a shift-torque increase controlling section configured to perform a torque increase control in which a command for temporarily increasing torque of a drive source starts to be outputted when a start estimation timing of torque phase has just come during a transition period given between start and end of the downshift; and a learning convergence judging section configured to judge whether the shift-pressure learning correction has converged.

7 Claims, 11 Drawing Sheets

| | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

LOW-BRAKE OIL PRESSURE – LAG SENSITIVITY CURVE
(UNDER NORMAL STATE)

LOW-BRAKE OIL PRESSURE – LAG SENSITIVITY CURVE
(UNDER FUEL RECOVERY)

CONTROL APPARATUS AND METHOD FOR AUTOMATIC TRANSMISSION

BACKGROUND OF THE INVENTION

The present invention relates to control apparatus and method for an automatic transmission, capable of performing a shift-torque increase control for temporarily increasing torque of a drive source against pull-in torque, e.g., at a time of coast downshift caused by an accelerator release.

U.S. Pat. No. 7,503,873 (corresponding to Japanese Patent Application publication No. 2006-69267) discloses a previously proposed control apparatus for an automatic transmission. In this technique, a fuel cut recovery is started during the coast downshift conducting a fuel cut, by detecting a drop of turbine rotational speed which occurs when a high-speed-side engagement element (friction element) is released so as to cause a neutral state.

In this technique, by carrying out a fuel cut recovery control during the downshift, a pull-in amount of torque is reduced during a torque phase before a start of inertia phase so that a pull-in shock is suppressed.

The "torque phase" is one of phases which occur during a progress of shift, and is defined as a phase in which an input rotational speed of the transmission does not vary and only an output-shaft torque of the transmission varies. Moreover, the "inertia phase" is one of phases which occur during the progress of shift, and is defined as a phase in which the input rotational speed of the transmission varies mainly due to an inertia change of drive system.

SUMMARY OF THE INVENTION

However, the technique of above control apparatus for an automatic transmission assumes that the neutral state occurs during the downshift. Hence, in a case that the state of transmission is transferred from the torque phase directly to the inertia phase without passing through the neutral state, the fuel cut recovery control cannot be activated at a proper timing so that the fuel cut recovery is carried out before a start of torque phase or during the inertia phase. In such cases, a recovery shock is caused.

In order to avoid this problem, it is conceivable that an actuation of fuel cut recovery is started based on a time management using a start timing of shift (output timing of a shift command) as its reference. However, the time length between a time point when a piston stroke has just been done up to its engaging start position and a time point when the inertia phase is started is not necessarily a constant time length even among automatic transmissions of identical type, due to a hardware dispersion in product, a time-dependent change or the like. Thereby, there is a possibility that the start timing of inertia phase deviates from the actuation timing of fuel cut recovery. Therefore, the phenomenon that the recovery shock is caused remains as an issue to be solved.

It is therefore an object of the present invention to provide control apparatus and method for an automatic transmission, devised to suppress the occurrence of shift shock which is caused by pull-in torque, and devised to suppress the occurrence of recovery shock by appropriately setting a start timing of shift-torque increase control when a downshift is performed.

According to one aspect of the present invention, there is provided a control apparatus for an automatic transmission adapted to achieve a plurality of transmission ratios by changing an engagement state of friction element in order to transmit torque from a drive source to a drive wheel, the control apparatus comprising: a shift-pressure learning correction controlling section configured to perform a shift-pressure learning correction in which a physical quantity representing a progress of shift is measured during a current downshift, and in which an engagement command pressure for the friction element is corrected during a next downshift on the basis of a divergence between the measured physical quantity and a target physical quantity; a shift-torque increase controlling section configured to perform a torque increase control in which a command for temporarily increasing torque of the drive source starts to be outputted when a start estimation timing of torque phase that is preset by a time management has just come during a shift transition period given between a shift start and a shift end of the downshift; and a learning convergence judging section configured to judges whether or not the shift-pressure learning correction performed by the shift-pressure learning correction controlling section has converged, to prohibit the torque increase control until it is decided that the shift-pressure learning correction has converged, and to permit the torque increase control when it is decided that the shift-pressure learning correction has converged.

According to another aspect of the present invention, there is provided a control method for an automatic transmission adapted to achieve a plurality of transmission ratios by changing an engagement state of friction element in order to transmit torque from a drive source to a drive wheel, the control method comprising: performing a shift-pressure learning correction in which a physical quantity representing a progress of shift is measured during a current downshift, and in which an engagement command pressure for the friction element is corrected during a next downshift on the basis of a divergence between the measured physical quantity and a target physical quantity; performing a torque increase control in which a command for temporarily increasing torque of the drive source starts to be outputted when a start estimation timing of torque phase that is preset by a time management has just come during a shift transition period given between a shift start and a shift end of the downshift; judging whether or not the shift-pressure learning correction has converged; prohibiting the torque increase control until it is decided that the shift-pressure learning correction has converged; and permitting the torque increase control when it is decided that the shift-pressure learning correction has converged.

According to still another aspect of the present invention, there is provided a control apparatus for an automatic transmission adapted to achieve a plurality of transmission ratios by changing an engagement state of friction element in order to transmit torque from a drive source to a drive wheel, the control apparatus comprising: means for performing a shift-pressure learning correction in which a physical quantity representing a progress of shift is measured during a current downshift, and in which an engagement command pressure for the friction element is corrected during a next downshift on the basis of a divergence between the measured physical quantity and a target physical quantity; means for performing a torque increase control in which a command for temporarily increasing torque of the drive source starts to be outputted when a start estimation timing of torque phase that is preset by a time management has just come during a shift transition period given between a shift start and a shift end of the downshift; means for judging whether or not the shift-pressure learning correction has converged; means for prohibiting the torque increase control until it is decided that the shift-pressure learning correction has converged; and means for permitting the torque increase control when it is decided that the shift-pressure learning correction has converged.

The other objects and features of this invention will become understood from the following description with reference to the accompanying drawings.

DETAILED DESCRIPTION OF THE INVENTION

Figure 1:
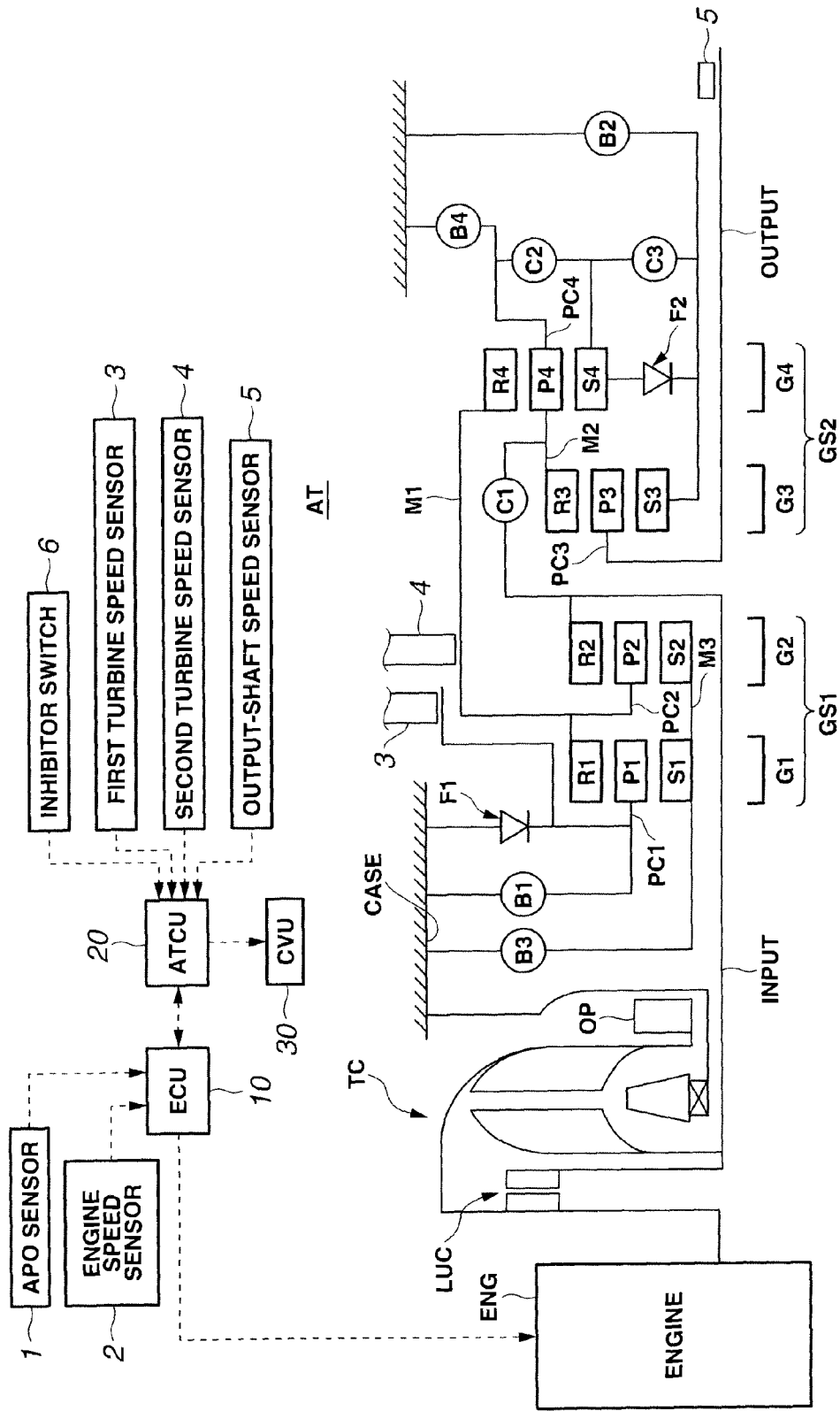
FIG. 1 is a skeleton diagram showing an automatic transmission (one example of automatic transmission having forward seven speeds and reverse one speed) to which a control apparatus of a first embodiment according to the present invention is applied.

Reference will hereinafter be made to the drawings in order to facilitate a better understanding of the present invention.

[First Embodiment]

A first embodiment of automatic-transmission control apparatus and method according to the present invention will be explained below referring to the drawings.

Figures 2, 3:
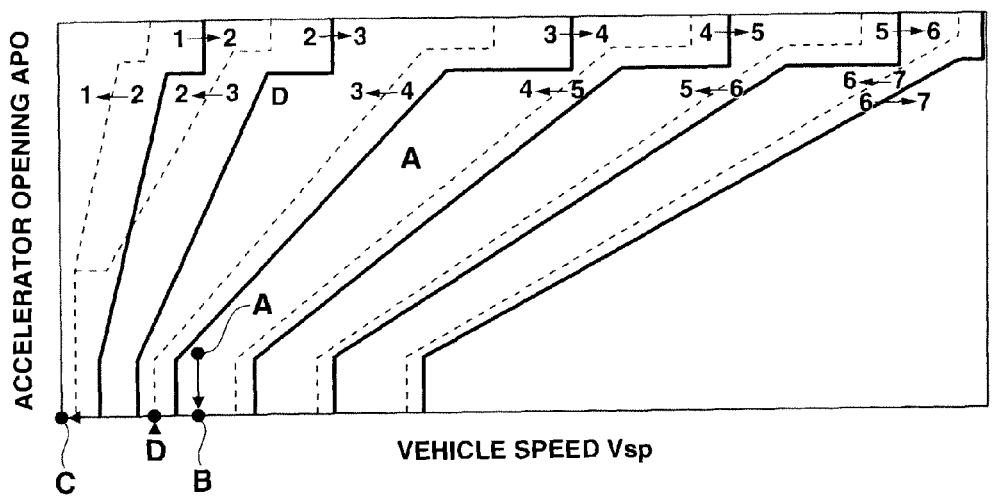
FIG. 2 is an engaging-operation table showing engagement states of respective friction elements for each transmission ratio of the automatic transmission to which the control apparatus of the first embodiment is applied.
FIG. 3 is a shift diagram showing one example of shift map which is used for a shift control in the first embodiment when a D-range is being selected in the automatic transmission.

At first, a configuration in the first embodiment is now explained. FIG. 1 is a skeleton diagram showing an automatic transmission AT (one example of automatic transmission) to which the control apparatus according to the present invention has been applied according to the first embodiment. This automatic transmission AT has forward seven speeds (seven transmission ratios, i.e., seven shift steps) and reverse one speed. FIG. 2 is an engaging-operation table showing engagement states of respective friction(-engagement) elements for each transmission ratio (each shift step) in the automatic transmission AT to which the shift control apparatus in the first embodiment is applied. FIG. 3 is a shift diagram showing one example of shift map which is used for the shift control in the first embodiment when a D-range is being selected in the automatic transmission AT.

The automatic transmission AT in the first embodiment includes an input shaft INPUT, four planetary gear mechanisms, seven friction elements and an output shaft OUTPUT. The input shaft INPUT of automatic transmission AT receives a driving force of an engine ENG through a torque converter TC. A rotation speed of the input shaft INPUT is changed by the four planetary gear mechanisms and the seven friction elements, and is outputted from the output shaft OUTPUT. Moreover, an oil pump OP is provided coaxially to a pump impeller of the torque converter TC, and is drivingly rotated by the driving force of engine ENG so as to pressurize oil.

A shift gear mechanism between the input shaft INPUT and the output shaft OUTPUT will now be explained. On an axis from the side of input shaft INPUT to the side of output shaft OUTPUT, a first planetary gear mechanism G1, a second planetary gear mechanism G2, a third planetary gear mechanism G3 and a fourth planetary gear mechanism G4 are arranged in this order. The first planetary gear mechanism G1 and the second planetary gear mechanism G2 constitute a first planetary gear set GS1. The third planetary gear mechanism G3 and the fourth planetary gear mechanism G4 constitute a second planetary gear set GS2. Moreover, a first clutch C1, a second clutch C2, a third clutch C3, a first brake B1, a second brake B2, a third brake B3 and a fourth brake B4 are provided as the friction elements. Moreover, there are provided a first one-way clutch F1 and a second one-way clutch F2.

The first planetary gear mechanism G1 is of single-pinion type. The first planetary gear mechanism G1 includes a first sun gear S1, a first ring gear R1, and a first carrier PC1 supporting a first pinion P1. The first pinion P1 engages or meshes with both gears S1 and R1.

The second planetary gear mechanism G2 is of single-pinion type. The second planetary gear mechanism G2 includes a second sun gear S2, a second ring gear R2, and a second carrier PC2 supporting a second pinion P2. The second pinion P2 engages or meshes with both gears S2 and R2.

The third planetary gear mechanism G3 is of single-pinion type. The third planetary gear mechanism G3 includes a third sun gear S3, a third ring gear R3, and a third carrier PC3 supporting a third pinion P3. The third pinion P3 engages or meshes with both gears 53 and R3.

The fourth planetary gear mechanism G4 is of single-pinion type. The fourth planetary gear mechanism G4 includes a fourth sun gear S4, a fourth ring gear R4, and a fourth carrier PC4 supporting a fourth pinion P4. The fourth pinion P4 engages or meshes with both gears S4 and R4.

The input shaft INPUT is connected with the second ring gear R2, so that a rotational driving force is inputted from the engine ENG through the torque converter TC and the like to the second ring gear R2. The output shaft OUT is connected with the third carrier PC3, so that an output rotational driving force is transmitted through a final gear and the like to drive road-wheels.

The first ring gear R1, the second carrier PC2 and the fourth ring gear R4 are connected integrally with one another by a first connecting member M1. The third ring gear R3 is connected integrally with the fourth carrier PC4 by a second connecting member M2. The first sun gear S1 is connected integrally with the second sun gear S2 by a third connecting member M3.

The first planetary gear set GS1 includes four rotation elements since the first planetary gear mechanism G1 is connected with the second planetary gear mechanism G2 by means of the first connecting member M1 and the third connecting member M3, as shown in FIG. 1. Moreover, the second planetary gear set GS2 includes five rotation elements since the third planetary gear mechanism G3 is connected with the fourth planetary gear mechanism G4 by means of the second connecting member M2.

In the first planetary gear set GS1, torque is inputted from the input shaft INPUT to the second ring gear R2, and is outputted through the first connecting member M1 to the second planetary gear set GS2. In the second planetary gear set GS2, torque is inputted from the input shaft INPUT directly to the second connecting member M2, and is also inputted through the first connecting member M1 to the fourth ring gear R4. The inputted torque is outputted from the third carrier PC3 to the output shaft OUTPUT.

The first clutch C1 (hereinafter also referred to as, input clutch I/C) is a clutch functioning to selectively connect or disconnect the input shaft INPUT with/from the second connecting member M2. The second clutch C2 (hereinafter also referred to as, direct dutch D/C) is a clutch functioning to selectively connect or disconnect the fourth sun gear S4 with/from the fourth carrier PC4. The third clutch C3 (hereinafter also referred to as, H&LR clutch H&LR/C) is a clutch functioning to selectively connect or disconnect the third sun gear S3 with/from the fourth sun gear S4.

The second one-way clutch F2 is disposed between the third sun gear S3 and the fourth sun gear S4. Thereby, the fourth sun gear S4 generates its rotational speed independently from that of the third sun gear S3, when the rotational speed of the fourth sun gear S4 is higher than that of the third sun gear S3 under a state where the third clutch C3 has been released. At this time, the third planetary gear mechanism G3 is connected through the second connecting member M2 with the fourth planetary gear mechanism G4, so that the third planetary gear mechanism G3 attains its gear ratio independent from that of the fourth planetary gear mechanism G4.

The first brake B1 (hereinafter also referred to as, front brake Fr/B) is a brake functioning to selectively stop the rotation of first carrier PC1 relative to a transmission case CASE (i.e., selectively fix the first carrier PC1 to the transmission case CASE). The first one-way clutch F1 is disposed in parallel with the first brake B1. The second brake B2 (hereinafter also referred to as, low brake Low/B) is a brake functioning to selectively stop the rotation of third sun gear S3 relative to the transmission case CASE. The third brake B3 (hereinafter also referred to as, 2346 brake 2346/B) is a brake functioning to selectively stop the rotation of third connecting member M3 coupling the first sun gear S1 with the second sun gear S2, relative to the transmission case CASE. The fourth brake B4 (hereinafter also referred to as, reverse brake R/B) is a brake functioning to selectively stop the rotation of fourth carrier PC4 relative to the transmission case CASE.

Next, operating states of the respective friction elements for each transmission-ratio (shift step) will now be explained referring to FIG. 2. In the table of FIG. 2, a sign ○ means that a corresponding friction element becomes in an engaged state (connected state), and the blank means that a corresponding friction element becomes in a released state (disconnected state). A sign (○) of FIG. 2 means that a corresponding friction element becomes in the engaged state when some range position activating an engine brake is being selected.

Each of the transmission-ratios (shift steps) for the forward seven speeds and reverse one speed can be achieved by releasing one friction element which has been engaged and by engaging the other one friction element which has been released, at the time of an upshift or downshift between adjacent transmission-ratios (shift steps). That is, each transmission ratio is attained by performing a changeover shift of friction element in the following manner.

Under the "first speed" (first shift step) of forward running side; only the second brake B2 becomes in the engaged state and thereby the first one-way clutch F1 and second one-way clutch F2 are engaged. Under the "second speed" of forward running side; the second brake B2 and third brake B3 become in the engaged state, and the second one-way clutch F2 is engaged. Under the "third speed" of forward running side; the second brake B2, third brake B3 and second clutch C2 become in the engaged state, and neither the first one-way clutch F1 nor second one-way clutch F2 is engaged. Under the "fourth speed" of forward running side; the third brake B3, second clutch C2 and third clutch C3 become in the engaged state. Under the "fifth speed" of forward running side; the first clutch C1, second clutch C2 and third clutch C3 become in the engaged state. Under the "sixth speed" of forward running side; the third brake B3, first clutch C1 and third clutch C3 become in the engaged state. Under the "seventh speed" of forward running side; the first brake B1, first clutch C1 and third clutch C3 become in the engaged state, and the first one-way clutch F1 is engaged. Under the "reverse speed" of reverse running side; the fourth brake B4, first brake B1 and third clutch C3 become in the engaged state.

Next, the shift control using an operating point (driving point) and the shift map will now be explained referring to FIG. 3. In FIG. 3, solid lines represent upshift lines (i.e., lines for upshift), and dotted lines represent downshift lines (i.e., lines for downshift).

When the D-range is being selected, an existing position of the operating point which is determined based on a vehicle speed Vsp derived from an output-shaft speed sensor 5 (=vehicle speed sensor) and an accelerator opening APO derived from an accelerator opening sensor 1 is searched for on the shift map. In a case that the operating point does not move or moves within a region of one transmission-ratio (shift step)

on the shift map of FIG. 3, the transmission ratio is maintained as it is. On the other hand, in a case that the operating point moves and cuts across (crosses over) the upshift line on the shift map of FIG. 3, an upshift command is outputted for changing the transmission ratio from its value represented by the region in which the operating point existed before cutting across the upshift line, to its value represented by a region in which the operating point exists after cutting across the upshift line. Moreover, in a case that the operating point moves and cuts across the downshift line on the shift map of FIG. 3, a downshift command is outputted for changing the transmission ratio from its value represented by the region in which the operating point existed before cutting across the downshift line, to its value represented by a region in which the operating point exists after cutting across the downshift line.

As a control system of the automatic transmission AT, the control apparatus in the first embodiment includes an engine controller (ECU) 10, an automatic-transmission controller (ATCU) 20 and a control valve unit (CVU) 30, as shown in FIG. 1. The engine controller 10 controls a drive state of the engine ENG. The automatic-transmission controller 20 controls a shift state and the like of the automatic transmission AT. The control valve unit 30 controls hydraulic pressure (oil pressure) of each friction element on the basis of output signals of the automatic-transmission controller 20. The engine controller 10 is connected or communicated with the automatic-transmission controller 20 through a CAN-communication line or the like. Thereby, sensor information, control information and the like are shared between the engine controller 10 and the automatic-transmission controller 20 via communication.

The engine controller 10 is connected with the accelerator opening sensor 1 for sensing an accelerator-pedal manipulated variable (operation amount) of a driver, and an engine speed sensor 2 for sensing a rotational speed of engine ENG. The engine controller 10 performs a fuel cut control, a fuel-cut recovery control (hereinafter referred to as "fuel recovery control"), a throttle-opening control and the like, on the basis of input information such as the engine rotational speed and the accelerator-pedal manipulated variable.

The automatic-transmission controller 20 is connected with a first turbine speed sensor 3, a second turbine speed sensor 4, an output-shaft speed sensor 5 and an inhibitor switch 6. The first turbine speed sensor 3 serves to sense a rotational speed of the first carrier PC1. The second turbine speed sensor 4 serves to sense a rotational speed of the first ring gear R1. The output-shaft speed sensor 5 serves to sense a rotational speed (=vehicle speed Vsp) of the output shaft OUTPUT. The inhibitor switch 6 serves to sense a range position of a shift lever which is selected by the driver. When a D-range (DRIVE range) is being selected; the automatic-transmission controller 20 searches and selects an optimum command transmission-ratio on the basis of the vehicle speed Vsp and the accelerator opening APO representing the accelerator-pedal manipulated variable, and outputs a hydraulic control command for achieving the command transmission-ratio, to the control valve unit 30.

Since the engine controller 10 is connected with the automatic-transmission controller 20 through the CAN-communication line or the like, various information are shared between the engine controller 10 and the automatic-transmission controller 20. Thereby, the engine controller 10 and the automatic-transmission controller 20 perform a total control for the engine ENG and the automatic transmission AT. That is, the automatic-transmission controller 20 which is one of these controllers 10 and 20 judges predetermined fuel recovery control requirements (conditions) when a coast downshift command is outputted. When the predetermined fuel recovery control requirements are satisfied, the automatic-transmission controller 20 outputs a fuel recovery control command (torque increase command) to the engine controller 10, and outputs a hydraulic control command for achieving the coast downshift to the control valve unit 30. On the other hand, the engine controller 10 which is another of these controllers 10 and 20 performs the fuel recovery control (i.e., a control for recovering a fuel injection of a part of cylinders or all cylinders which is undergoing a fuel cut) for increasing an output torque of engine ENG to which the fuel cut control is being applied, on the basis of the fuel recovery control command inputted from the automatic-transmission controller 20.

Figure 4:
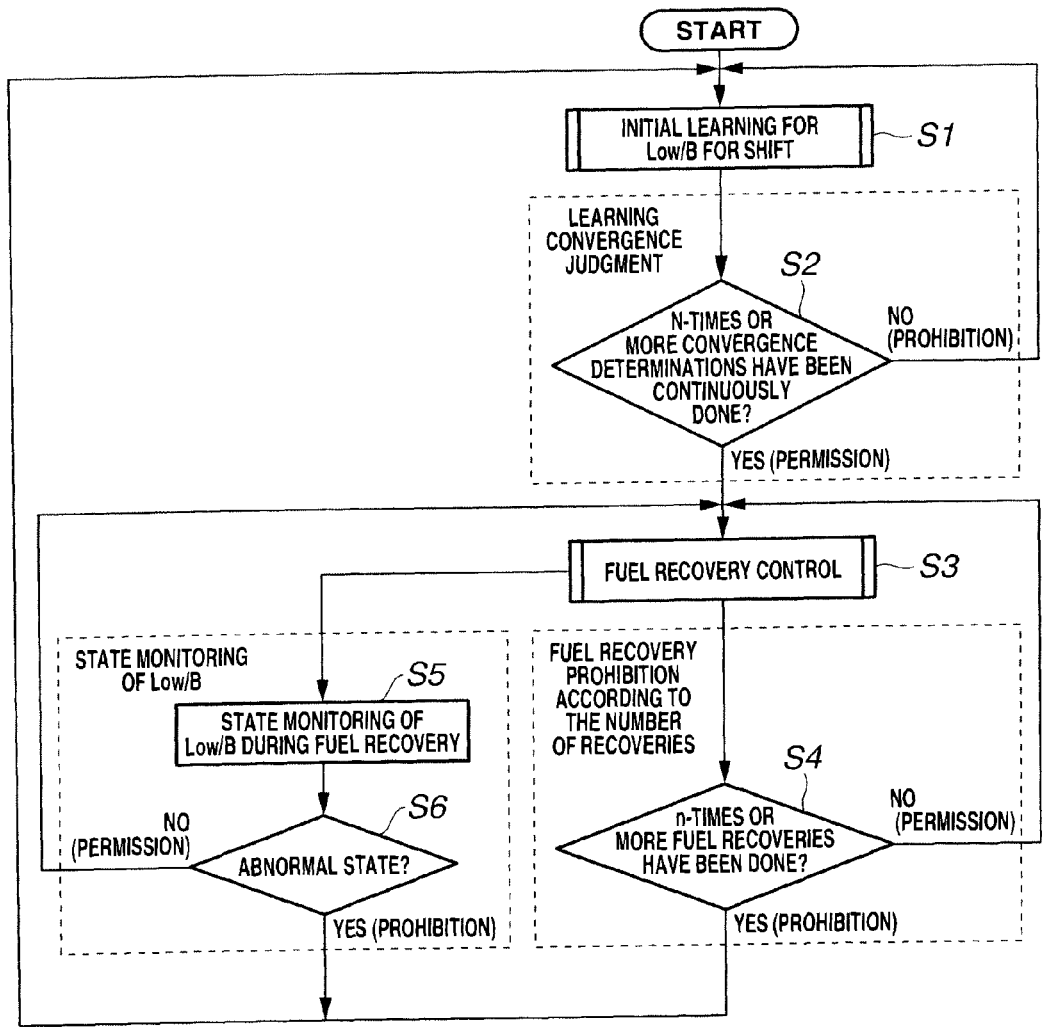
FIG. 4 is a flowchart showing a flow of a fuel-recovery-control go/no-go judging process for judging whether a fuel recovery control is permitted or prohibited during a coast downshift executed by an automatic-transmission controller 20 in the first embodiment.

FIG. 4 is a flowchart showing a flow of a fuel-recovery-control go/no-go judging process for judging whether the fuel recovery control is permitted or prohibited during the coast downshift executed by the automatic-transmission controller 20 in the first embodiment. Each step thereof will now be explained.

At step S1, during a current coast downshift, the controller measures a time length from an occurrence of shift command to a start of inertia phase, as a physical quantity representing a progress of the shift. Then, the controller carries out a shift-pressure learning correction for correcting an engagement command pressure for a friction element, on the basis of a divergence (deviation degree) between the measured time length (i.e., actually necessary time as an actual physical quantity) and a preset target time length (target physical quantity). This corrected engagement command pressure is used when the corresponding friction element is engaged at a time of next coast downshift. Then, the program proceeds to step S2. It is noted that the operation of S1 corresponds to a shift-pressure learning correction controlling section or means according to the present invention.

For example, in a case of coast downshift from the fourth speed to the third speed; a hydraulic command value of the low brake Low/B which is engaged at the time of shift from the fourth speed to the third speed is corrected, and the hydraulic command value and a learning correction amount obtained by this correction are stored in a memory. This memory storing in the learning correction is done by, for example, a method in which temperature of working oil of the transmission is divided into a plurality of steps of oil-temperature regions, and the pair of the hydraulic command value and the learning correction amount are stored in one of memories prepared for every oil-temperature region.

At step S2 subsequent to the shift-pressure learning correction of step S1, the control judges whether or not the shift-pressure leaning correction has converged. If NO at step S2, namely if a convergence requirement of shift-pressure leaning correction is not satisfied; the program returns to step S1. If YES at step S2, namely if the convergence requirement of shift-pressure leaning correction is satisfied; the program proceeds to step S3.

That is, the fuel recovery control (torque increase control) is prohibited until it is decided that the shift-pressure leaning correction has already converged, and the fuel recovery control (torque increase control) is allowed when it is decided that the shift-pressure leaning correction has already converged. It is noted that the operation of S2 corresponds to a learning convergence judging section or means according to the present invention.

At step S2, for example, a convergence judging target (H) and a convergence judging target (L) are set for the time interval (hereinafter also referred to as, 43-IP-start necessary time) between a time point of occurrence of a 4-3 coast downshift command and a time point of start of the inertia phase, on the basis of a lag sensitivity curve of oil pressure (friction element pressure) of low brake Low/B.

In a case that a value of the 43-IP-start necessary time which is obtained by the learning is within a range between the convergence judging target (H) and the convergence judging target (L), a convergence determination is done. When this convergence determination has been continuously repeated N-times (the number of repetitions is equal to N), the convergence decision requirement (convergence requirement) is satisfied. It is noted that the convergence judging target (H) corresponds to a convergence-judging upper limit according to the present invention, and the convergence judging target (L) corresponds to a convergence-judging lower limit according to the present invention.

This number of N is set to take two values different between in an initial stage and in a second stage (second time around) or later. That is, in a case that the learning convergence judgment is conducted for the first time, an initial convergence decision requirement is that the convergence determination has been continuously repeated five times without interruption (without no-convergence determination). On the other hand, in a case that the learning convergence judgment is restarted in response to a fuel recovery control prohibition in the second stage or later after the fuel recovery control (torque increase control) has been once performed, a continuation convergence decision requirement is that the convergence determination has been continuously repeated two times without the interruption. It is noted that the number of five-times repetitions corresponds to a first number of times according to the present invention, and the number of two-times repetitions corresponds to a second number of times according to the present invention.

At step S3 subsequent to the decision of satisfaction of the convergence requirement in the shift-pressure learning correction at step S2, the controller starts to output the fuel recovery control command. This fuel recovery control command is outputted for temporarily increasing the torque of engine ENG at a torque-phase start estimation timing which is preset by a time management, in a shift transition period given between a shift start and a shift end during the coast downshift. Then, the program proceeds to steps S4 and S5 in parallel, i.e., concurrently. It is noted that the operation of S3 corresponds to a shift-torque increase controlling section or means according to the present invention.

In this step S3, the controller repeatedly carries out a hydraulic control of coast downshift which uses an identical learned value (one value given by the shift-pressure learning correction of step S1) and which includes the fuel recovery control, while the fuel recovery control is being permitted.

At step S4 subsequent to the fuel recovery control of step S3, the controller counts the number of experiences of coast downshifts which have been performed with the fuel recovery control and which have used the identical learned value. Then, the controller judges whether or not the number of experiences is greater than or equal to n (setting number: for example, four times). If YES at step S4, namely if Number Of Experiences≧n Times; the program returns to step S1. If NO at step S4, namely if Number Of Experiences<n Times; the program returns to step S3. That is, when the number of experiences becomes greater than or equal to n; the controller prohibits the fuel recovery control for coast downshift, and restarts the learning correction at step S1. It is noted that the operation of S4 corresponds to a first torque-increase-control prohibiting section or means according to the present invention.

At step S5 subsequent to the fuel recovery control of step S3, the controller measures a duration time of the inertia phase, during the coast downshift in which the fuel recovery control is being executed. Then, the program proceeds to step S6. It is noted that the operation of S5 corresponds to an inertia-phase duration-time monitoring section or means according to the present invention.

At step S6 subsequent to the measurement of inertia phase duration time under the coast downshift at step S5, the controller judges whether or not the measured inertia phase duration time is in an abnormal state (takes an improper value). This abnormal state is defined as a case that the measured inertia phase duration time is outside a range of permissible time length determined based on the lag sensitivity curve of oil pressure in the low brake Low/B. If YES at step S6, namely if the inertia phase duration time is out of the permissible-time range, the program returns to step S1. If NO at step S6, namely if the inertia phase duration time is within the permissible-time range, the program returns to step S3. That is, when the inertia phase duration time is outside the permissible-time range, the controller prohibits the fuel recovery control during the coast downshift and restarts the learning correction. It is noted that the operation of S6 corresponds to a second torque-increase-control prohibiting section or means according to the present invention.

Figure 5:
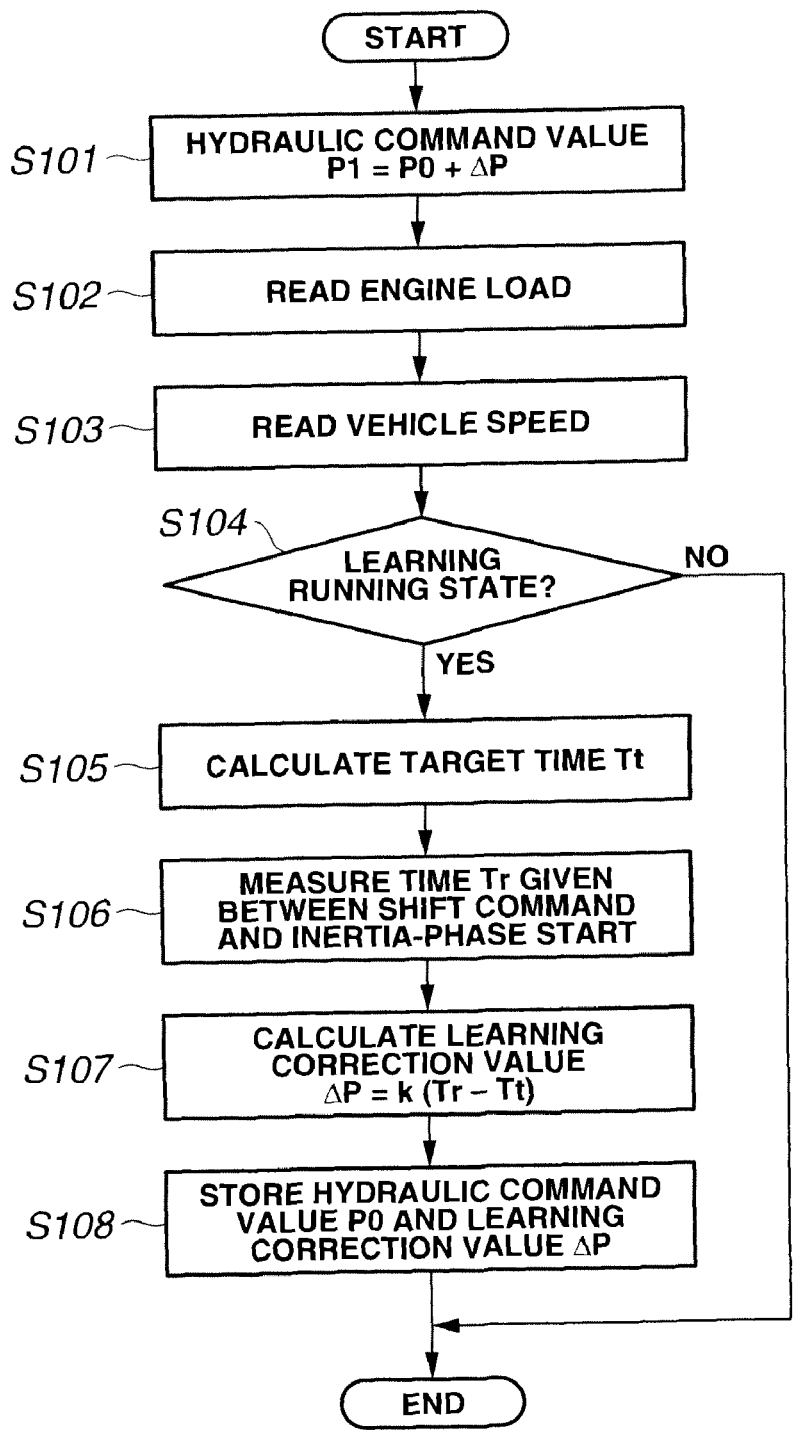
FIG. 5 is a flowchart showing a process flow of a shift-pressure learning correction control which is executed at step S1 of FIG. 4.

FIG. 5 is a flowchart showing a process flow of the shift-pressure learning correction control which is executed at step S1 of FIG. 4. Each step of FIG. 5 will be explained.

For example, as shown in FIG. 3, an example is now given that the vehicle state moves from a driving point "A" in the fourth-speed position to a driving point B by an accelerator releasing manipulation (foot release) at a time of stop signal of traffic light or the like, and the vehicle is decelerated by an actuation of engine brake and is stopped at a driving point C so that the vehicle state moves from the driving point B to the driving point C. In this case, when a coast downshift command for $4^{th} \rightarrow 3^{rd}$ is outputted at a driving point D existing between the driving points B and C; the controller sets a current (current-time around) hydraulic command value P1, at a value obtained by adding an after-mentioned previous (last-time around) learning correction value AP to a hydraulic command value P0, at step S101. This hydraulic command value P0 is a value used at a time of previous (last-time around) coast downshift for $4^{th} \rightarrow 3^{rd}$. Then, the program proceeds to step S102.

At step S102 subsequent to the calculation of current hydraulic command value P1 at step S101, the controller reads a throttle valve opening TVO of engine ENG from a throttle opening sensor 1, as an engine load. Then, the program proceeds to step S103.

At step S103 subsequent to the read-in of throttle opening TVO of step S102, the controller reads the vehicle speed Vsp from the output-shaft speed sensor 5. Then, the program proceeds to step S104.

At step S104 subsequent to the read-in of vehicle speed Vsp of step S103, the controller judges whether or not a current running state of vehicle satisfies a leaning running requirement for high leaning sensitivity. For example, this leaning running requirement is that the throttle opening TVO is lower than or equal to a predetermined opening and the vehicle speed Vsp is lower than or equal to a predetermined vehicle speed. If YES at step S104, namely if the leaning running requirement is satisfied; the program proceeds to step S105. If NO at step S104, namely if the leaning running requirement is not satisfied; the program proceeds to an end of flowchart.

At step S105 subsequent to the determination of satisfaction of leaning running requirement at step S104, the controller calculates a target time Tt by using an oil temperature ATF of automatic transmission AT. This target time Tt is a time length corresponding to a target piston-stroke time necessary between a time point of output of shift start command and a time point of start of inertia phase. Then, the program proceeds to step S106.

The target time Tt is calculated every shift type (pattern) in accordance with the throttle opening TVO, the vehicle speed Vsp, the automatic-transmission oil temperature ATF and the like. The target time Tt is calculated as a time length capable of achieving a high-quality shift without shock or timelike prolongation.

At step S106 subsequent to the calculation of target time Tt of step S105, the controller measures a timer time Tr. This timer time Tr is an actual piston-stroke time (length) given between the time point of output of shift start command and the time point of start of inertia phase. Then, the program proceeds to step S107.

At step S107 subsequent to the measurement of timer time Tr of step S106, the controller calculates the learning correction value (amount) ΔP by using the following formula.

$$\Delta P = k(Tr - Tt)$$

wherein k denotes a constant for determining the correction value relative to a time difference.

An upper limit value and a lower limit value are preset for the learning correction value ΔP, every friction element. Then, the program proceeds to step S108.

At step S108 subsequent to the calculation of learning correction value ΔP of step S107, the controller stores the hydraulic command value P0 and the learning correction value ΔP in a storage portion of storage area which corresponds to a (current) leaning running state. These hydraulic command value P0 and learning correction value ΔP serve as an information for calculating the hydraulic command value P1 of next shift. Then, the program proceeds to the end of flowchart.

The storage area for the hydraulic command value P0 and learning correction value ΔP is, in advance, divided into a plurality of storage portions, for example by an area segmentation according to the learning running state based on the shift type, the throttle opening TVO, the vehicle speed Vsp, the automatic-transmission oil temperature ATF and the like.

Figure 6:
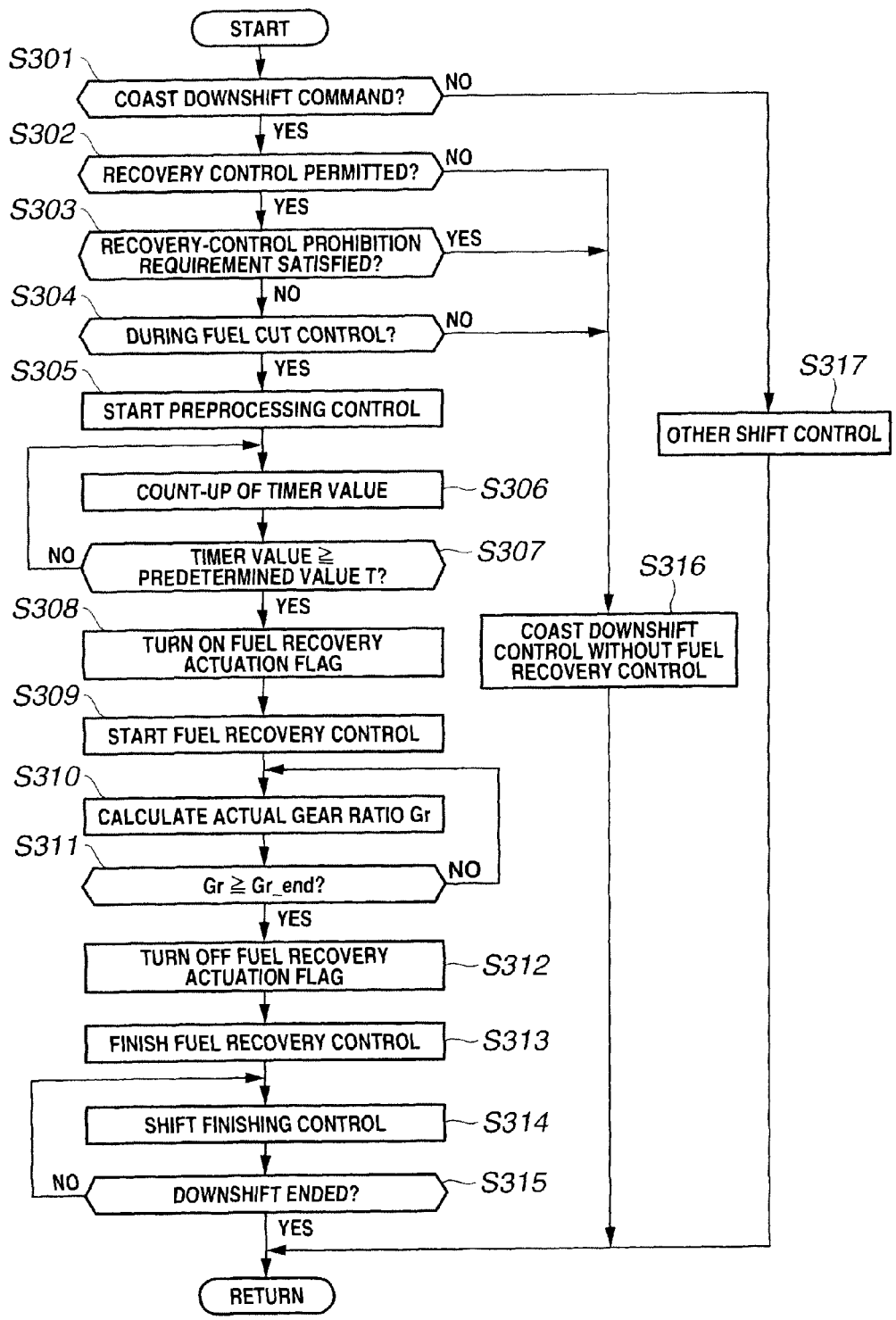
FIG. 6 is a flowchart showing a process flow of a coast downshift control including the fuel recovery control which is executed at step S3 of FIG. 4.

FIG. 6 is a flowchart showing a process flow of the coast downshift control including the fuel recovery control which is executed at step S3 of FIG. 4. Each step of FIG. 6 will now be explained.

At step S301, the controller judges whether or not the coast downshift command has been outputted. If YES at step S301, namely in a case of presence of the output of coast downshift command; the program proceeds to step S302. If NO at step S301, namely in a case of absence of the output of coast downshift command, the program proceeds to step S317.

At step S302 subsequent to the determination of presence of the coast-downshift-command output of step S301, the controller judges whether or not the fuel recovery control has been already permitted. If YES at step S302, namely in a case of permission of the fuel recovery control; the program proceeds to step S303. If NO at step S302, namely in a case of prohibition of the fuel recovery control; the program proceeds to step S316.

At step S303 subsequent to the determination of permission of the fuel recovery control of step S302, the controller judges whether or not any of a plurality of prohibition requirements for the fuel recovery control is satisfied. If YES at step S303, namely if any of the prohibition requirements for the fuel recovery control is satisfied, the program proceeds to step S316. If NO at step S303, namely if none of the prohibition requirements for the fuel recovery control is satisfied, the program proceeds to step S304.

This prohibition requirements for the fuel recovery control are, for example, a fail determination of sensor or the like, an OFF determination of idle switch, a determination of neutral or reverse range, a determination of change mind, a determination of prohibited oil-temperature region, and the like.

At step S304 subsequent to the determination of non-satisfaction of the prohibition requirements for fuel recovery control at step S303, the controller judges whether or not the engine ENG is under the fuel cut control. If YES at step S304, namely if the fuel cut control is being carried out; the program proceeds to step S305. If NO at step S304, namely if the fuel cut control is not being carried out; the program proceeds to step S316.

At step S305 subsequent to step S304, the controller starts a preprocessing control of shift hydraulic pressure in the coast downshift. Then, the program proceeds to step S306.

For example, in the case of $4^{th} \rightarrow 3^{rd}$ coast downshift, an initial pressure starts to be supplied to the low brake Low/B.

At step S306 subsequent to the start of preprocessing control of step S305, the controller counts up (i.e., increments) a value of a timer which was activated at the time of start of the preprocessing control. Then, the program proceeds to step S307.

At step S307 subsequent to the increment of timer value of step S306, the controller judges whether or not the timer value obtained from the start of preprocessing control is greater than or equal to a predetermined value T. For example, this predetermined value T is shorter than the target time Tt of the piston-stroke learning correction control, and is an estimation time length capable of starting the torque phase (i.e., an estimated time length between the start of preprocessing control and a timing at which the torque phase starts). If YES at step S307, namely in a case of [Timer Value≧Predetermined Value T], the program proceeds to step S308. If NO at step S307, namely in a case of [Timer Value<Predetermined Value T], the program returns to step S306.

At step S308 subsequent to the determination of [Timer Value≧Predetermined Value T] of step S307, the controller turns a fuel recovery actuation flag from OFF to ON. Then, the program proceeds to step S309.

At step S309 subsequent to the ON operation of fuel recovery actuation flag of step S308, the controller starts the fuel recovery control. Then, the program proceeds to step S310.

At step S310 subsequent to the start of fuel recovery control of step S309, the controller calculates an actual gear ratio Gr by using an input rotational-speed information of transmission derived from both the turbine speed sensors 3 and 4 and an output rotational-speed information of transmission derived from the output-shaft speed sensor 5. This actual gear ratio Gr is a rotational-speed ratio between the input and output of the transmission. Then, the program proceeds to step S311.

At step S311 subsequent to the calculation of actual gear ratio Gr of step S310, the controller judges whether or not the actual gear ratio Gr is greater than or equal to an inertia-phase end judging threshold value Gr_end. If YES at step S311, the program proceeds to step S312. If NO at step S311, the program returns to step S310.

At step S312 subsequent to the determination of [Gr≧Gr_end] of step S311, the controller sets the fuel recovery actuation flag from ON to OFF. Then, the program proceeds to step S313.

At step S313 subsequent to the OFF operation of fuel recovery actuation flag of step S312, the controller finishes the fuel recovery control. Then, the program proceeds to step S314.

At step S314 subsequent to the finish of fuel recovery control of step S313, the controller carries out a shift finishing control. In this shift finishing control, the pressure of the friction element to be engaged is increased up to a level of line pressure. Then, the program proceeds to step S315.

At step S315 subsequent to the shift finishing control of step S314, the controller judges whether or not the coast downshift has ended. If YES at step S315, namely if it is determined that the coast downshift has already ended; the program proceeds to a return of the flowchart. If NO at step S315, namely if it is determined that the coast downshift has not yet ended; the program returns to step S314.

At step S316 subsequent to one of steps 302, 303 and 304, the controller carries out a coast downshift control without the fuel recovery control. Then, the program proceeds to the return of flowchart.

At step S317 subsequent to the determination of absence of the coast-downshift-command output at step S301, the controller executes the other shift control(s) such as a power-on downshift, a power-off upshift or a power-on upshift. Then, the program proceeds to the return of flowchart.

Next, operations and effects will be explained below.

At first, "Reason that the avoidance of recovery shock is impossible in a control of comparative example" will be explained. Subsequently, operations and effects of the automatic-transmission control apparatus in the first embodiment will be explained by being divided into "Operation and effect of the piston-stroke learning correction control", "Operation and effect of the learning convergence judgment", "Operation and effect of the fuel-recovery-control prohibition depending on the number of experiences", "Operation and effect of the fuel-recovery-control prohibition depending on the monitoring of low-brake state" and "Operation and effect of the $4^{th} \rightarrow 3^{rd}$ coast downshift control including the fuel recovery control".

[Reason that the Avoidance of Recovery Shock is Impossible in a Control of Comparative Example]

Figure 7:
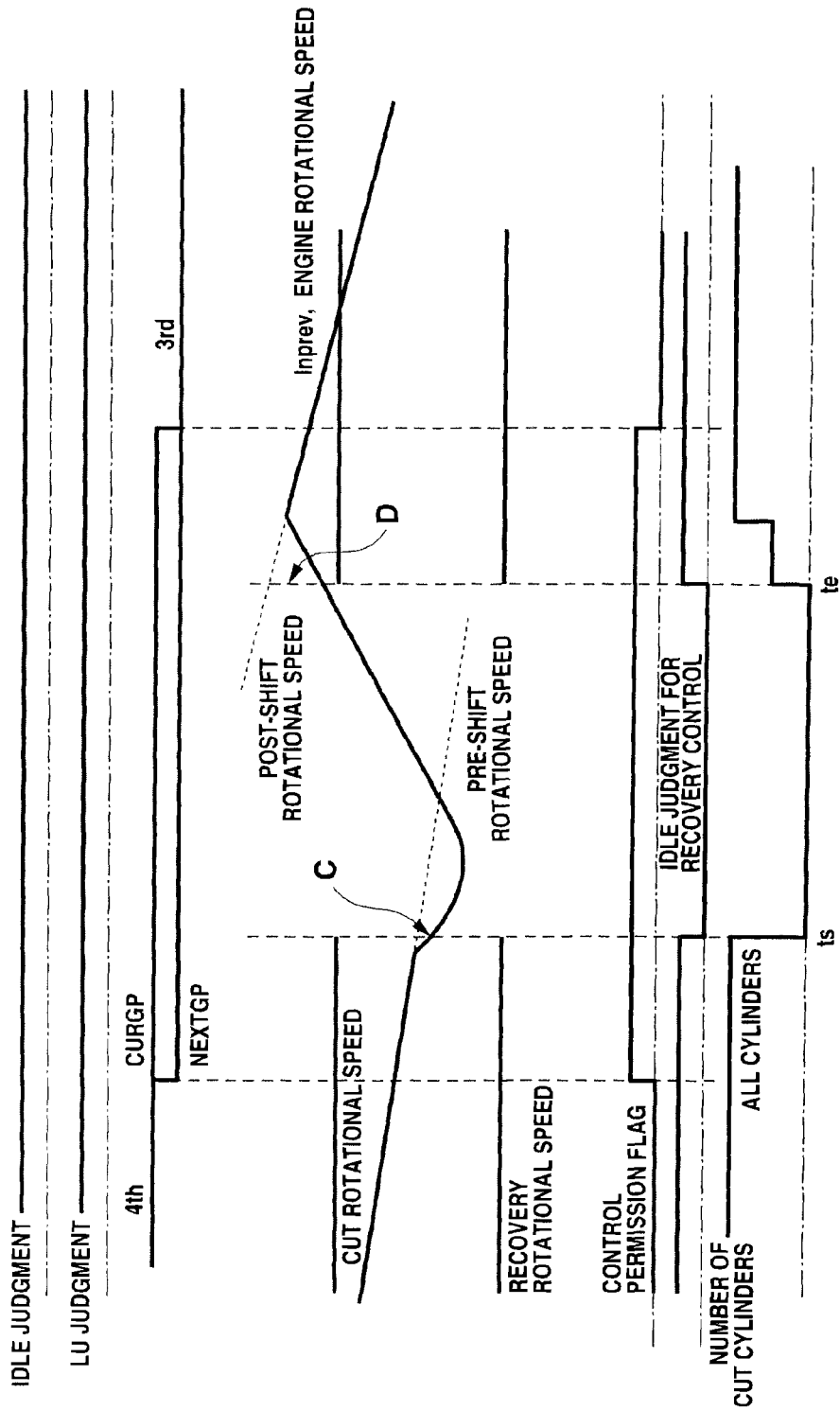
FIG. 7 is a time chart showing respective characteristics of an idle judgment, a coasting judgment, a gear position, an input rotational speed of the transmission, a control permission flag, a judgment of an idle for recovery control, and the number of cut cylinders, under a $4^{th} \rightarrow 3^{rd}$ coast downshift control including the fuel recovery control in a comparative example.

FIG. 7 is a time chart showing respective characteristics of an idle judgment, a coasting judgment, a gear position (transmission-ratio position), an input rotational speed of transmission, a control permission flag, a judgment of an idle for recovery control, and a number of cut cylinders, under a $4^{th} \rightarrow 3^{rd}$ coast downshift control including the fuel recovery control in the comparative example. Referring to FIG. 7, the reason why the coast downshift control including the fuel recovery control in the comparative example disenables the avoidance of recovery shock is explained as follows.

A coast downshift with an accelerator released is caused, for example, when the driver conducts an accelerator releasing manipulation (foot release) because of a turn to red in traffic light ahead of the vehicle and thereby an engine brake takes effect so that the vehicle speed is gradually reduced. Such a coast downshift occurs frequently and occurs usually under a smooth running state (driving state). Hence, during this coast downshift, the driver can be sensitively aware of even a little shock, and therefore, a control capable of bringing shock to an extremely favorable level is required.

In the comparative example, a drop of turbine rotational speed which is caused when a high-speed-side engagement element (i.e., friction element that is engaged for high-speed-side transmission ratio) is released to cause a neutral state during the coast downshift is detected as shown by an arrow C of FIG. 7, and thereby a recovery control of fuel cut is started at a time point ts. Then, when an actual gear ratio approaches a gear ratio value of post-shift (an arrow D of FIG. 7), it is determined that the inertia phase has ended. Hence, at a time point te, the recovery control of fuel cut is finished.

In this comparative example, if the drop of turbine rotational speed is accurately detected, a pull-in amount of torque becomes smaller during the torque phase before the start of inertia phase because the fuel cut recovery control is conducted during the downshift. Accordingly, a shock due to pull-in torque is suppressed.

However, the control of the comparative example assumes that the neutral state occurs during the coast downshift. Hence, in a case that the state of transmission is transferred from the torque phase directly to the inertia phase without passing through the neutral state, the fuel cut recovery control cannot be activated at a proper timing so that the fuel cut recovery control is carried out before the start of torque phase or during the inertia phase. In such cases, the recovery shock occurs.

That is, in dependence upon an engagement relation among engagement (friction) elements of clutches and brakes in some of various types of automatic transmissions, there is a case that the neutral state is not caused during the coast downshift so that the inertia phase for which the transmission ratio (gear ratio) is varying is directly started. In such a case, the drop of turbine rotational speed cannot be detected.

In order to avoid this problem, it is conceivable that the actuation of fuel cut recovery is started based on a time management (timeout timer) using the output timing of shift command as its reference. However, the time length between a time point when the piston stroke to its engaging start position has just been done and a time point when the inertia phase starts does not necessarily become a constant time length even among automatic transmissions of identical type, due to a hardware dispersion in products, a time-dependent change or the like. Thereby, there is a possibility that the start timing of inertia phase is deviated from the actuation timing of fuel cut recovery. Therefore, the phenomenon that the recovery shock occurs remains as an issue to be solved.

[Operation and Effect of the Piston-Stroke Learning Correction Control]

Figure 8:
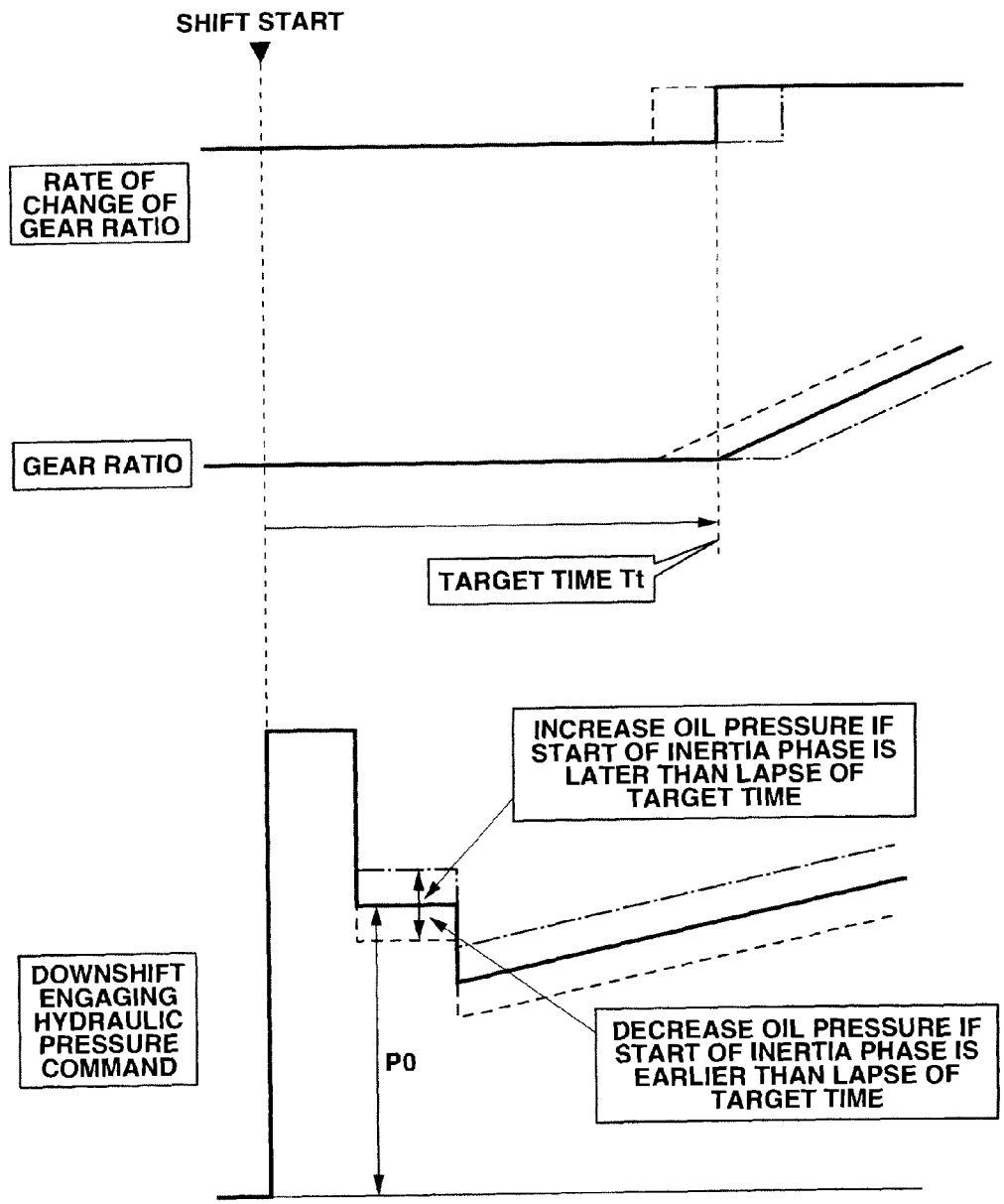
FIG. 8 is a time chart which shows respective characteristics of a rate of change of gear ratio, a gear ratio and a downshift engaging hydraulic command, in a transition period of downshift; and which explains a piston-stroke learning correction control of shift hydraulic pressure in the first embodiment.

FIG. 8 is a time chart showing respective characteristics of a rate of change of gear ratio, the gear ratio and the downshift engaging hydraulic command, in the transition period of downshift. FIG. 8 is given for explaining the piston-stroke learning correction control of shift hydraulic pressure in the first embodiment. The operation and effect of the piston-stroke learning correction control are now explained referring to FIGS. 5 and 8.

When the leaning running requirement is satisfied during a vehicle traveling, the program proceeds as step S101→step S102→step S103→step S104→step S105→step S106→step S107→step S108 in the flowchart of FIG. 5. At step S107, the learning correction amount ΔP is calculated by use of the formula: ΔP=k (Tr−Tt).

That is, if the start of inertia phase is later than (lapse of) the target time Tt, namely in the case of Tr>Tt; the previous (last-time around) hydraulic command value P0 shown by a solid-line characteristic of FIG. 8 is increased by k (Tr−Tt). Thus, the hydraulic characteristic (profile) is slid as shown by an alternate-long-and-short-dash-line characteristic of FIG. 8, so as to bring the timer time Tr closer to the target time Tt at the time of next downshift, as much as possible.

On the other hand, if the start of inertia phase is earlier than (lapse of) the target time Tt, namely in the case of Tr<Tt; the previous hydraulic command value P0 shown by the solid-line characteristic of FIG. 8 is decreased by k (Tr−Tt). Thus, the hydraulic characteristic (profile) is slid as shown by a dotted-line characteristic of FIG. 8, so as to bring the timer time Tr closer to the target time Tt at the time of next downshift, as much as possible.

As mentioned above, in the first embodiment, the technique of piston-stroke learning correction control is employed as a learning correction technique for correcting the dispersion (variability) of the engaging hydraulic pressure at the time of shift, every friction element. Accordingly, the engaging hydraulic pressure of low brake Low/B at the time of $4^{th} \rightarrow 3^{rd}$ coast downshift is brought close to its optimum value. By repeating the experience of piston-stroke learning correction control, the piston-stroke time length (PS time) of low brake Low/B between the shift start and the start of inertia phase can be maintained at an approximately constant time length.

[Operation and Effect of the Learning Convergence Judgment]

Figure 9:
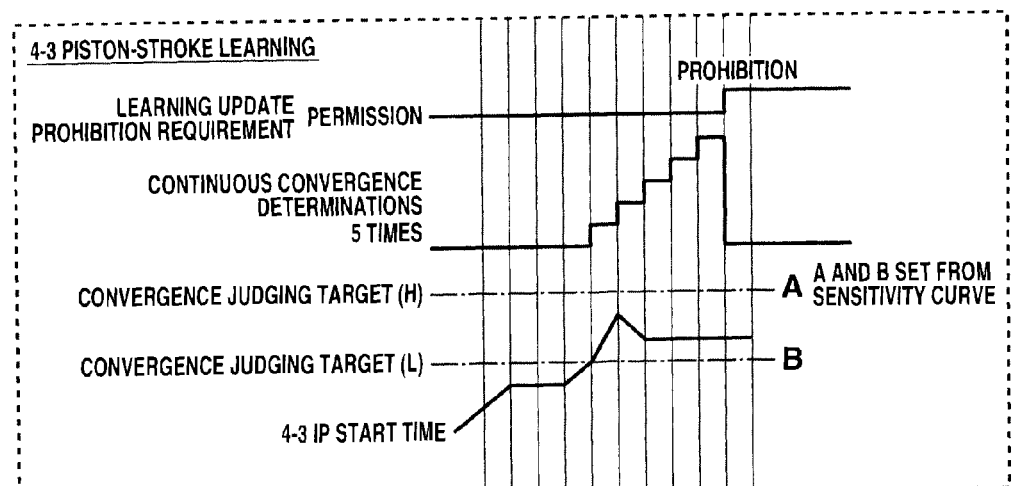
FIG. 9 is a learning experience chart which shows respective characteristics of a permission/prohibition in a learning update prohibition requirement, the number of consecutive convergence determinations, a $4^{th} \rightarrow 3^{rd}$ inertia-phase start time, and a permission/prohibition of the fuel recovery control; and which explains a learning convergence judgment in the first embodiment.
Figure 10:
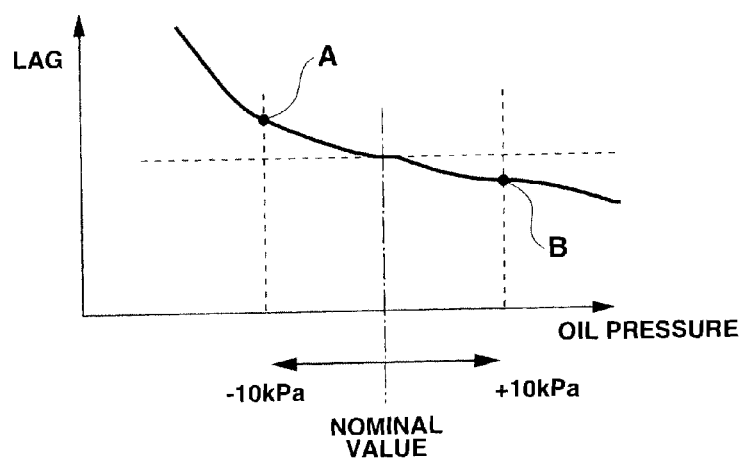
FIG. 10 is a characteristic view showing a lag sensitivity curve relative to a low-brake oil pressure, which is provided for determining a convergence judging target (H) and a convergence judging target (L) for the $4^{th} \rightarrow 3^{rd}$ inertia-phase start time in the learning convergence judgment.

FIG. 9 is a learning experience chart showing respective characteristics of a permission/prohibition in a learning update prohibition requirement, a number of consecutive convergence determinations, a $4^{th} \rightarrow 3^{rd}$ inertia-phase start time, a permission/prohibition of the fuel recovery control. FIG. 9 is given for explaining the learning convergence judgment in the first embodiment. FIG. 10 is a characteristic view showing a lag sensitivity curve relative to the low-brake oil pressure, which is provided for determining the convergence judging target (H) and the convergence judging target (L) for the $4^{th} \rightarrow 3^{rd}$ inertia-phase start time in the learning convergence judgment. Operation and effect of the learning convergence judgment are now explained referring to FIGS. 9 and 10.

It is required that the shift is made to have a stability (robustness) against the dispersion, the time-dependent change or the like, by increasing an accuracy of shift so as to bring the shift to close to an assumed model (nominal model) of control system as much as possible.

Hence, with respect to the $4^{th} \rightarrow 3^{rd}$ inertia-phase start time (43-IP-start necessary time) between the occurrence time of $4^{th} \rightarrow 3^{rd}$ coast downshift command and the start of inertia phase, the convergence judging target (H) and the convergence judging target (L) are determined and set by using a nominal position as a center between the convergence judging target (H) and the convergence judging target (L), as shown by the lag sensitivity curve relative to the low-brake oil pressure in FIG. 10. That is, the convergence judging target (H) is set at a position "A" distant from the nominal position by −10 kPa, and the convergence judging target (L) is set at a position B distant from the nominal position by +10 kPa.

Accordingly, the convergence is determined when the $4^{th} \rightarrow 3^{rd}$ inertia-phase start time (43-IP-start necessary time) becomes within the range between the convergence judging target (H) and the convergence judging target (L) by the repetition of learning, as shown in FIG. 9. The convergence decision requirement is satisfied when this convergence determination has been continuously repeated five times, namely when the five-times convergence determinations have just been done. Thus, the $4^{th} \rightarrow 3^{rd}$ inertia-phase start time is accurately brought close to an intermediate time between the convergence judging target (H) and the convergence judging target (L), i.e., dose to a nominal time (length).

Therefore, since the fuel recovery control is permitted by being changed from its prohibited state to its permitted state when the convergence determinations have continued five times, the start timing of fuel recovery control can be forced to become an appropriate timing given during the torque phase which is earlier than the inertia-phase start timing of $4^{th} \rightarrow 3^{rd}$ shift, at the time of next $4^{th} \rightarrow 3^{rd}$ coast downshift, namely when a next-time-around $4^{th} \rightarrow 3^{rd}$ coast downshift is carried out. As a result, a high-level $4^{th} \rightarrow 3^{rd}$ coast downshift which can effectively prevent the recovery shock and the pull-in shock can be achieved.

When the $4^{th} \rightarrow 3^{rd}$ coast downshift including the fuel recovery control which is carried out based on the permission of fuel recovery control is carried out, the piston-stroke learning correction control is not carried out, as shown by a prohibition status in the learning update prohibition requirement of FIG. 9. That is, the piston-stroke learning correction control is not carried out while the fuel recovery control is being permitted. This is because the lag sensitivity to the low-brake oil pressure in the case where the fuel recovery control is not carried out is not applicable when the $4^{th} \rightarrow 3^{rd}$ coast downshift including the fuel recovery control is carried out.

[Operation and Effect of the Fuel-Recovery-Control Prohibition Depending on the Number of Experiences]

Figure 11:
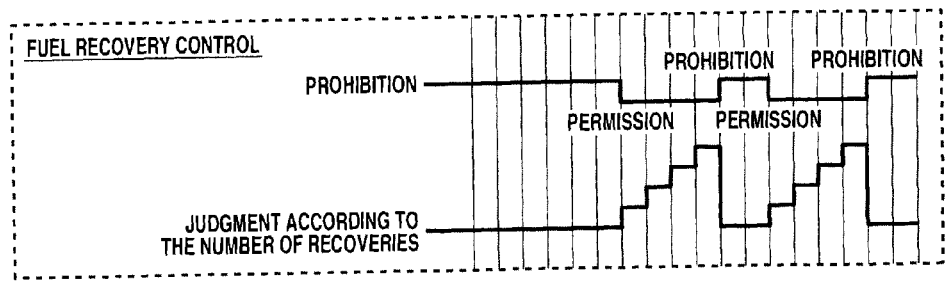
FIG. 11 is a recovery experience chart which shows respective characteristics of a permission/prohibition of the fuel recovery control and a judgment depending on the number of recoveries; and which explains a permission/prohibition judgment of fuel recovery control according to the number of experiences in the first embodiment.

FIG. 11 is a recovery experience chart showing respective characteristics of a permission/prohibition of the fuel recovery control and a judgment depending on the number of recoveries. FIG. 11 is given for explaining the permission/prohibition judgment of fuel recovery control according to the number of experiences in the first embodiment. Operation and effect of the prohibition of fuel recovery control depending on the number of experiences are now explained referring to FIG. 11.

In viewpoint of a deterioration of shift hydraulic control system (solenoid valve, control valve) for controlling the hydraulic pressure supplied to the low brake Low/B; in a case of normally closed (normal-low) solenoid valve, the hydraulic pressure is increased due to the deterioration because working oil tends to be enclosed due to the deterioration. Contrary to this, in a case of normally open (normal-high) solenoid valve, the hydraulic pressure is reduced due to the deterioration because working oil tends to be drained due to the deterioration. Moreover, in a case of control valve, the hydraulic pressure is reduced due to the deterioration.

In the case of reduced hydraulic pressure, the inertia phase starts under the fuel recovery control so that there is little lag sensitivity. Moreover, in the case of increased hydraulic pressure, the inertia phase starts under the shift hydraulic pressure so that there is the lag sensitivity. Therefore, if the shift hydraulic control system deteriorates to reduce the hydraulic pressure, the state of low brake Low/B cannot be monitored by use of the start lag of inertia phase.

Therefore, in the first embodiment, as shown in FIG. 11, when the fuel recovery control has been repeated continuously four times in response to the permission of fuel recovery control, the fuel recovery control is prohibited subsequent two times only. During these two shift, the piston-stroke learning correction control of shift hydraulic pressure is conducted again. Then, the fuel recovery control is again permitted continuously four times. Thus, a prohibition process of fuel recovery control based on the number of fuel recoveries is executed.

Accordingly, in the case that the hydraulic pressure supplied to the low brake Low/B is reduced due to the deterioration, the piston-stroke learning correction is automatically carried out after the four-times experiences of the fuel recovery control. By this piston-stroke learning correction, the hydraulic pressure is increased up to its appropriate level. This prohibition process of fuel recovery control according to the number of experiences handles (serves as a solution control against) the deterioration of shift hydraulic control system. As a result, the time interval between the shift start and the start of inertia phase can be kept constant, irrespective of the deterioration of shift hydraulic control system due to a long-term use.

The number of convergence determinations in the piston-stroke learning correction control which is conducted in response to this prohibition process of fuel recovery control based on the number of experiences is set at 2 (two times). Because, a degree of the dispersion is quite small as compared with the initial state since the five-times continuous convergence determinations were already done initially. That is, a continuation convergence decision requirement is that the convergence determination has been continuously repeated two times. Therefore, an early restart of the fuel recovery control is achieved while ensuring a convergence performance.

[Operation and Effect of the Fuel-Recovery-Control Prohibition Depending on the Monitoring of Low-Brake State]

Figure 12:
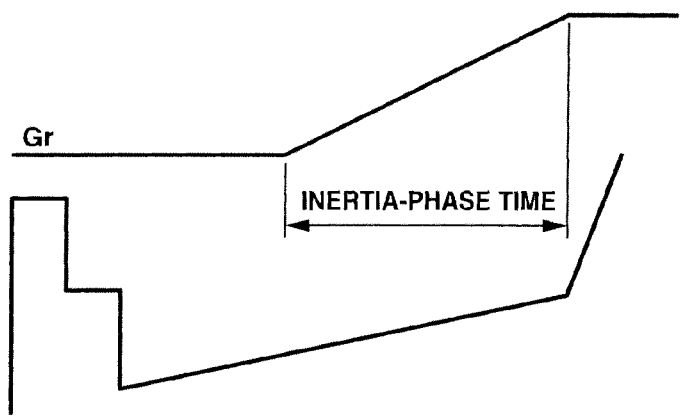
FIG. 12 is a view which shows respective characteristics of the gear ratio and the low-brake oil pressure; and which explains an inertia-phase time that is used for monitoring a state of low brake in the first embodiment.
Figure 13:
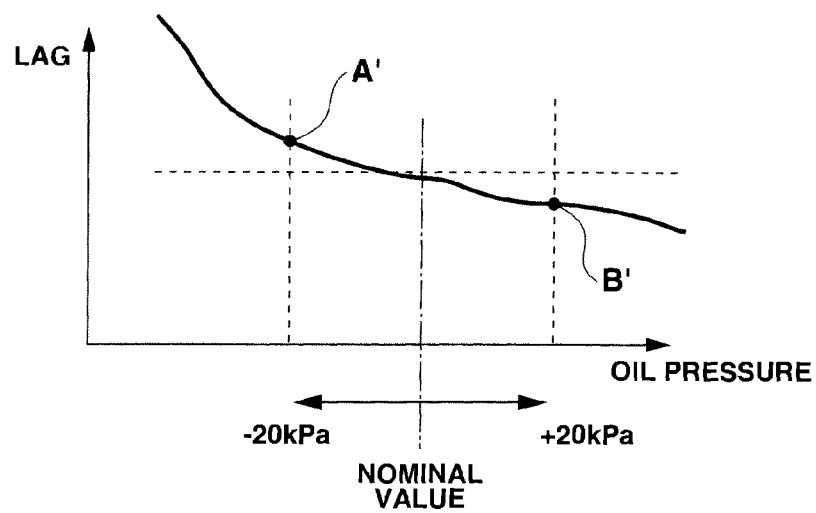
FIG. 13 is a characteristic view which shows a lag sensitivity curve relative to the low-brake oil pressure, and which is for determining an abnormal-state judging threshold value in the monitoring of low-brake state.

FIG. 12 is a view showing respective characteristics of the gear ratio and the pressure of low brake Low/B. FIG. 12 is given for explaining the inertia-phase time (length) which is used for monitoring the state of low brake Low/B in the first embodiment. FIG. 13 is a characteristic view showing a lag sensitivity curve relative to the low-brake oil pressure, which is for determining an abnormal-state judging threshold value for the monitoring of state of low brake Low/B. Operation and effect of the prohibition of fuel recovery control depending on the low-brake state monitoring are now explained referring to FIGS. 12 and 13.

During the coast downshift including the fuel recovery control, the time length between the start of preprocessing and the start of inertia phase does not have the oil-pressure sensitivity (lag sensitivity), since this time length receives influences of the stroke time or the torque phase. That is, an inertia-phase start (time lag) under the fuel recovery control does not form the relation of oil-pressure sensitivity. Contrary to this, as shown in FIG. 12, the inertia-phase time (length) for which the gear ratio is varying can have the oil-pressure sensitivity by considering a dispersion (variability) of recovery torque, because the fuel recovery control is performed over entire range of the inertia phase.

During the coast downshift including the fuel recovery control, the state of low brake Low/B is monitored by use of the inertia-phase time. That is, the dispersion of recovery torque is approximately ±16 Nm, i.e., ranges within ±16 Nm. When this dispersion range is converted into oil pressure, a corresponding oil pressure range is ±20 kPa. Hence, as shown by the lag sensitivity curve relative to the low-brake oil pressure of FIG. 13, the oil pressure range between a position A' distant from a nominal position by −20 kPa and a position B' distant from the nominal position by +20 kPa is regarded as an oil-pressure dispersion range which is caused due to the dispersion of recovery torque. That is, these positions A' and B' are set around the nominal position by using the magnitude of 20 kPa. A range of the necessary time (length) which is between a value of the inertia-phase time (length) taken at the position A' and a value of the inertia-phase time (length) taken at the position B' is used as the state judging threshold values of low brake Low/B according to the inertia-phase time length.

Accordingly, if the inertia-phase time length measured during the coast downshift including the fuel recovery control is within the range of the necessary time, it is determined that the state of low brake Low/B is in normal (proper) state. On the other hand, if the inertia-phase time length measured during the coast downshift including the fuel recovery control is outside the range of the necessary time, it is determined that the state of low brake Low/B is in abnormal (improper) state.

In the case that it has been determined that the state of low brake Low/B is in the abnormal state, the fuel recovery control is prohibited two times. During this two-times prohibition, the piston-stroke learning correction control for shift oil pressure is carried out again. Afterward, the fuel recovery control is permitted again. Thus, the prohibition process of fuel recovery control is performed by monitoring the state of low brake Low/B.

Therefore, if some abnormality is caused in the low brake Low/B, the oil pressure is returned to its appropriate level by the piston-stroke learning correction based on the state monitoring of low brake Low/B. That is, when the low brake Low/B becomes in some abnormal state, the fuel recovery control is prohibited so as to carry out the piston-stroke learning correction. Accordingly, the shift shock due to the pull-in torque and the recovery shock which is caused due to the abnormal state of low brake Low/B can be prevented.

The number of convergence determinations in the piston-stroke learning correction control which is conducted by this prohibition process of fuel recovery control based on the state monitoring of low brake Low/B is set at 2 (two times). Because, a degree of the dispersion is quite small as compared with the initial state since the five-times continuous convergence determinations were already done initially. That is, a continuation convergence decision requirement is that the convergence determination has been continuously repeated two times. Therefore, an early restart of the fuel recovery control is achieved while ensuring the convergence performance, in the same manner as the case of prohibition process of fuel recovery control based on the number of experiences.

[Operation and Effect of the $4^{th} \rightarrow 3^{rd}$ Coast Downshift Control Including the Fuel Recovery Control]

Figure 14:
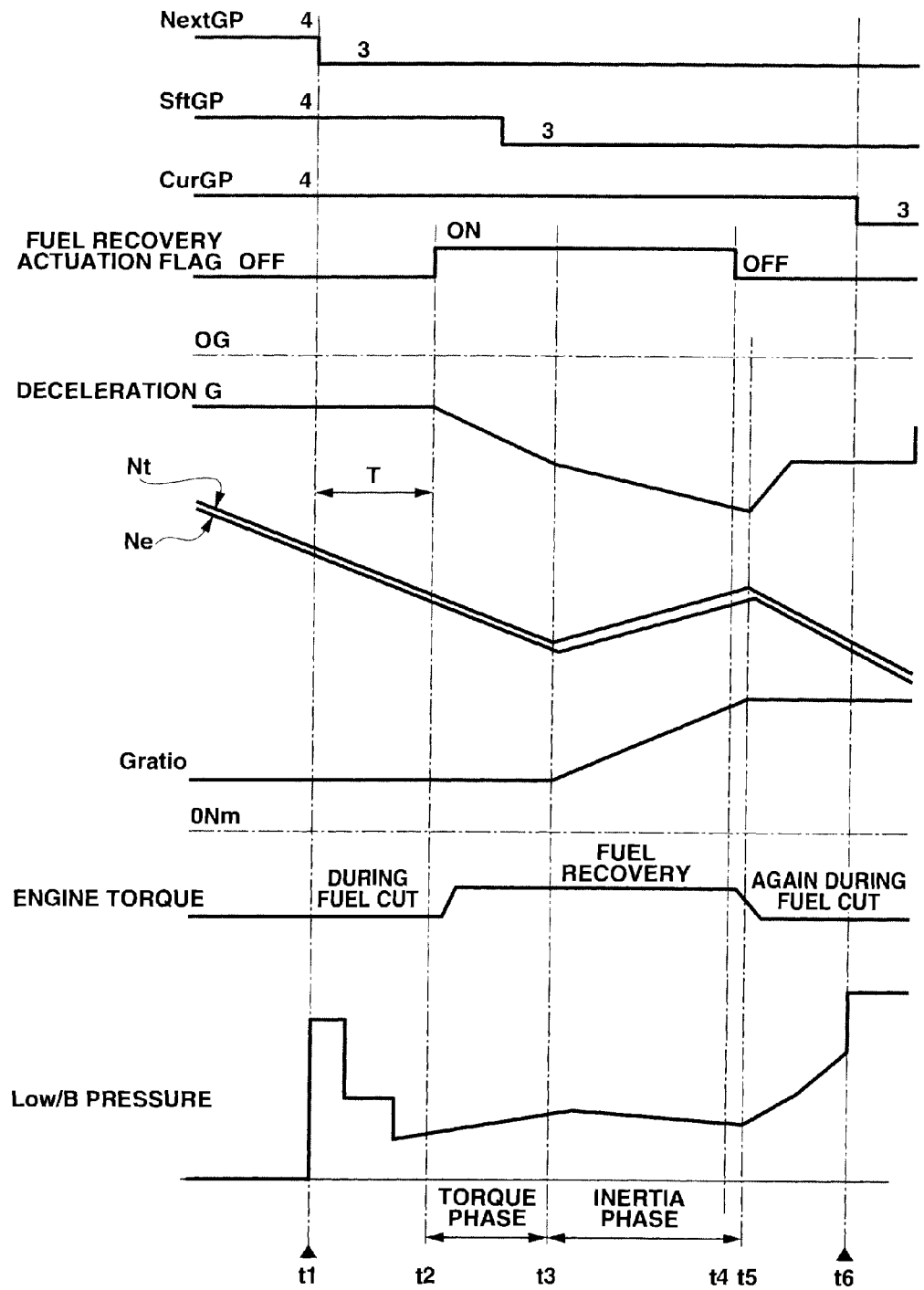
FIG. 14 is time charts showing respective characteristics of a shift-command gear ratio (NextGP), a control gear ratio (SftGP), a current gear ratio (CurGP), a fuel recovery actuation flag, a deceleration G, the turbine rotational speed (Nt), an engine rotational speed (Ne), an actual gear ratio (Gratio), an engine torque and the low-brake pressure, at the time of $4^{th} \rightarrow 3^{rd}$ coast downshift including the fuel recovery control in the first embodiment.

FIG. 14 is time charts showing respective characteristics of a shift-command gear ratio (NextGP), a control gear ratio (SftGP), a current gear ratio (CurGP), the fuel recovery actuation flag, a deceleration G, the turbine rotational speed (Nt), the engine rotational speed (Ne), the actual gear ratio (Gratio), the engine torque and the low-brake pressure, at the time of $4^{th} \rightarrow 3^{rd}$ coast downshift including the fuel recovery control in the first embodiment. Operation and effect of the $4^{th} \rightarrow 3^{rd}$ coast downshift control including the fuel recovery control are now explained referring to FIGS. 6 and 14.

When at least one of the following three requirements of (1) the fuel recovery control is being prohibited, (2) the prohibition requirement of fuel recovery is being satisfied and (3) the fuel cut control is not being executed, is satisfied; the coast downshift control including no fuel recovery control is carries out even if the coast downshift command is being outputted. That is, the program proceeds as step S301→step S302 (→step S303 →step S304) step S316 RETURN in the flowchart of FIG. 6.

Accordingly, for example, when the learning convergence decision has not yet been outputted because the convergence determination has not been continuously repeated five times for initial convergence decision or two times for second or later convergence decision; the piston-stroke learning correction control is carried out so that the coast downshift control is performed without the fuel recovery control.

On the other hand, when all of the following three requirements of (1) the fuel recovery control is being permitted, (2) the prohibition requirement of fuel recovery is not being satisfied, and (3) the fuel cut control is being executed, are satisfied while the coast downshift command is being outputted; the program proceeds as step S301→step S302→step S303→step S304→step S305→step S306→step S307 in the flowchart of FIG. 6. The shift hydraulic pressure control is performed in dependence upon a shift oil-pressure profile given by the piston-stroke learning correction control until it is determined that the timer value is greater than or equal to the predetermined value T at step S307.

Then, when it is determined that the timer value is greater than or equal to the predetermined value T at step S307, the program proceeds to step S308. At step S308, the fuel recovery actuation flag is turned from OFF to ON. At next step S309, the fuel recovery control is started. At next step S310, the actual gear ratio Gr is calculated. The fuel recovery control is being executed until it is determined that the actual gear ratio Gr is greater than or equal to the inertia-phase end judging threshold value Gr_end at step S311. Then, if it is determined that the actual gear ratio Gr is greater than or equal to the inertia-phase end judging threshold value Gr_end at step S311, the fuel recovery actuation flag is turned from ON to OFF at step S312. At next step S313, the fuel recovery control is finished.

At step S314, the shift finishing control for increasing the pressure of friction element to be engaged (the pressure of low brake Low/B in the case of $4^{th} \rightarrow 3^{rd}$ coast downshift) up to the level of line pressure is carried out, until it is determined that the coast downshift has ended at step S315. When it is determined that the coast downshift has ended at step S315, the program proceeds to RETURN of the flowchart.

FIG. 14 is time charts showing this $4^{th} \rightarrow 3^{rd}$ coast downshift control including the fuel recovery control.

At first, when the $4^{th} \rightarrow 3^{rd}$ coast downshift command is outputted at time point t1, the fuel recovery control starts with a little response delay from time point t2 which is delayed from time point t1 by the predetermined value T. This start timing of fuel recovery control accords with (is approximately identical with) the start timing of torque phase. Thereby, the fuel recovery control continues from time point t2 through the inertia-phase start time point t3 to the inertia-phase end determination time point t4 obtained based on the actual gear ratio (Gratio).

By virtue of this fuel recovery control, a negative engine torque (engine brake) during the fuel cut approaches 0 Nm by the increase of torque so that the reduction of deceleration G (deceleration relative to gravitational acceleration) is effectively suppressed. Hence, both of the recovery shock and the shift shock due to pull-in torque are suppressed. Then, the shift finishing control starts from the inertia-phase end time point t5. At time point t6, the $4^{th} \rightarrow 3^{rd}$ coast downshift control ends.

Next, advantageous effects will now be explained.

The control apparatus for an automatic transmission in the first embodiment can obtain the following listed advantageous effects.

(1) In the first embodiment, the control apparatus for the automatic transmission AT adapted to achieve the plurality of transmission ratios by changing the engagement state of friction element (C1-C3, B1-B4) in order to transmit torque from the drive source (ENG) to the drive wheel(s) includes the shift-pressure learning correction controlling section (step S1 for carrying out the piston-stroke learning correction); the shift-torque increase controlling section (step S3 for carrying out the fuel recovery control); and the learning convergence judging section (step S2 for judging the learning convergence). The shift-pressure learning correction controlling section is configured to perform the shift-pressure learning correction in which the physical quantity representing a progress of shift is measured during a current downshift, and in which the engagement command pressure for the friction element is corrected during a next downshift on the basis of the divergence between the measured physical quantity and the target physical quantity. The shift-torque increase controlling section is configured to perform the torque increase control in which a command for temporarily increasing torque of the drive source (ENG) starts to be outputted when the start estimation timing of torque phase that is preset by the time management has just come during the shift transition period given between start and end of the downshift. The learning convergence judging section is configured to judges whether or not the shift-pressure learning correction performed by the shift-pressure learning correction controlling section (S1) has converged, configured to prohibit the torque increase control until it is decided that the shift-pressure learning correction has converged, and configured to permit the torque increase control when it is decided that the shift-pressure learning correction has converged.

That is, in a case that the shift-torque increase control is activated by a time management when the shift-pressure learning correction has not yet converged, there is a possibility that the shift-torque increase control is activated after the start of inertia phase so that the recovery shock is caused. Contrary to this, in the first embodiment according to the present invention, the torque increase control is allowed after confirming the decision that the shift-pressure learning correction has already converged. Hence, a dispersion (variability) of the start timing of inertia phase is suppressed, and thereby the torque increase control can be started at an appropriate stage during the torque phase.

Therefore, the start timing of shift-torque increase control (fuel recovery control) is appropriately set during the downshift. Therefore, the occurrence of shift shock due to pull-in torque can be suppressed with the occurrence of recovery shock suppressed.

(2) The learning convergence judging section (step S2) is configured to set the convergence-judging upper limit (convergence judging target (H)) and the convergence-judging lower limit (convergence judging target (L)) for the necessary time given between the start of shift command and the start of inertia phase (IP), on the basis of the lag sensitivity curve of friction-element pressure. A nominal value of this necessary time is treated as the center between the convergence-judging upper limit and the convergence-judging lower limit. Moreover, the learning convergence judging section (step S2) is configured to output the convergence determination of shift-pressure learning correction when the actual necessary time given between the start of shift command and the start of inertia phase (IP) obtained by the shift-pressure learning correction is within a range between the convergence-judging upper limit and the convergence-judging lower limit; and configured to finally decide that the shift-pressure learning correction has converged, when this converge determination has been continuously repeated multiple times.

Accordingly, the actual time (actual necessary time length) between the start timing of shift command and the start timing of inertia phase accurately approaches its nominal value, so that the torque increase control (fuel recovery control) can be started at an appropriate timing during the torque phase capable of suppressing the shock.

(3) The shift-torque increase controlling section (step S3) is configured to repeatedly carry out the hydraulic control for the downshift including the torque increase control which uses an identical learned value (learned pressure value) while the torque increase control is being permitted. Moreover, the control apparatus in the first embodiment further includes the first torque-increase-prohibiting section (step S4) configured to count the number of experiences of the downshift including the torque increase control which uses the identical learned value; and configured to prohibit the torque increase control for downshift so that the learning correction is restarted by the shift-pressure learning correction controlling section (step S1), when the number of experiences becomes greater than or equal to a predetermined number.

Accordingly, this prohibition process of the torque increase control (fuel recovery control) in dependence upon the number of experiences serves as a solution control against the deterioration of shift hydraulic control system. Therefore, the time interval between the shift start and the inertia-phase start can be kept constant, irrespective of the deterioration of shift hydraulic control system due to a long-term use.

(4) The control apparatus in the first embodiment further includes the inertia-phase duration-time monitoring section (step S5) and the second torque-increase-control prohibiting section (step S6). The inertia-phase duration-time monitoring section (step S5) is configured to measure the duration time of inertia phase (IP) during the downshift in which the torque increase control is being carried out by the shift-torque increase controlling section (step S3). The second torque-increase-control prohibiting section (step S6) is configured to prohibit the torque increase control for downshift so that the shift-pressure learning correction is restarted by the shift-pressure learning correction controlling section (S1), when the measured duration time of inertia phase is outside a range of permissible duration time determined based on the lag sensitivity curve of friction-element pressure.

Accordingly, if some abnormality is caused in the friction element (low brake Low/B), the torque increase control (fuel recovery control) is prohibited so that the learning control is again carried out. Therefore, the recovery shock due to the abnormality of friction element and the shift shock due to the pull-in effect can be prevented.

(5) The learning convergence judging section (step S2) is configured to decide that the shift-pressure learning correction has converged, if the convergence determination has been continuously repeated the first number of times when the initial (first-time-around) learning convergence decision is conducted. Moreover, the learning convergence judging section is configured to decide that the shift-pressure learning correction has converged, if the convergence determination has been continuously repeated the second number of times when the second-time-around or later learning convergence decision is re-conducted in response to the prohibition of torque increase control (fuel recovery control) after the experience of torque increase control. This second number of times is smaller than the first number of times.

Accordingly, while achieving an improvement in convergence accuracy at the time of initial convergence decision, the convergence performance can be secured and an early restart of the torque increase control (fuel recovery control) can be achieved at the time of second-time-around or later convergence decision.

Although the invention has been described above with reference to the first embodiment according to the invention, the invention is not limited to the embodiment described above. Modifications and variations of the embodiment described above will occur to those skilled in the art in light of the above teachings.

For example, in the first embodiment, the example has been described in which the control apparatus according to the present invention is applied to the automatic transmission having forward seven speeds and reverse one speed. However, as a matter of course, the control apparatus according to the present invention is applicable to an automatic transmission having a different structure of transmission-ratios (shift steps). That is, the present invention is applicable to any automatic transmission which achieves a plurality of transmission-ratios by changing engagement states of friction elements for transmitting torque from a drive source to a drive wheel(s).

Moreover, in the first embodiment, the example has been described in which the control apparatus according to the present invention is applied to the engine vehicle equipped with an engine as its drive source. However, the control apparatus according to the present invention may be applied to a hybrid vehicle equipped with an engine and a motor as its drive sources. Moreover, the control apparatus according to the present invention may be applied to an electric vehicle equipped with a motor as its drive source. In a case that the torque increase control is performed by the motor, a regeneration recovery control is conducted so as to recover a decelerating regeneration amount given at the time of coast downshift.

This application is based on a prior Japanese Patent Application No. 2009-074081 filed on Mar. 25, 2009. The entire contents of this Japanese Patent Application are hereby incorporated by reference.

The scope of the invention is defined with reference to the following claims.

What is claimed is:

1. A control apparatus for an automatic transmission adapted to achieve a plurality of transmission ratios by changing an engagement state of a friction element in order to transmit torque from a drive source to a drive wheel, the control apparatus comprising:
   a shift-pressure learning correction controlling processor configured to perform a shift-pressure learning correction in which a physical quantity representing a progress of shift is measured during a current downshift, and in which an engagement command pressure for the friction element is corrected during a next downshift on a basis of a divergence between the measured physical quantity and a target physical quantity;
   a shift-torque increase controlling section configured to perform a torque increase control in which a command for temporarily increasing torque of the drive source starts to be outputted when a start estimation timing of torque phase that is preset by a time management has just come during a shift transition period given between a shift start and a shift end of the downshift; and
   a learning convergence judging section configured:
      to judge whether or not the shift-pressure learning correction performed by the shift-pressure learning correction controlling section has converged,
      to prohibit the torque increase control until it is decided that the shift-pressure learning correction has converged, and
      to permit the torque increase control when it is decided that the shift-pressure learning correction has converged.

2. The control apparatus as claimed in claim 1, wherein the learning convergence judging section is configured:
   to set a convergence-judging upper limit and a convergence-judging lower limit for a necessary time given between a start of a shift command and a start of an inertia phase, on a basis of a lag sensitivity curve of pressure of the friction element, wherein a nominal value of the necessary time is a center between the convergence-judging upper limit and the convergence-judging lower limit,
   to output a convergence determination of the shift-pressure learning correction when an actual necessary time given between the start of the shift command and the start of inertia phase obtained by the shift-pressure learning correction is within a range between the convergence-judging upper limit and the convergence-judging lower limit, and to finally decide that the shift-pressure learning correction has converged when the converge determination has been continuously repeated multiple times.

3. The control apparatus as claimed in claim 1, wherein the shift-torque increase controlling section is configured to repeatedly carry out a hydraulic control for the downshift including the torque increase control which uses an identical learned value while the torque increase control is being permitted; and wherein the control apparatus further comprises a first torque-increase-control prohibiting section configured:

to count a number of experiences of the downshift including the torque increase control which uses the identical learned value, and to prohibit the torque increase control for the downshift so that the shift-pressure learning correction is restarted by the shift-pressure learning correction controlling section, when the number of experiences becomes greater than or equal to a predetermined number.

4. The control apparatus as claimed in claim 1, wherein the control apparatus further comprises:

an inertia-phase duration-time monitoring section configured to measure a duration time of an inertia phase during the downshift in which the torque increase control is being carried out by the shift-torque increase controlling section; and a second torque-increase-control prohibiting section configured to prohibit the torque increase control for the downshift so that the shift-pressure learning correction is restarted by the shift-pressure learning correction controlling section, when the measured duration time of the inertia phase is outside a range of permissible duration time based on a lag sensitivity curve of pressure of the friction element.

5. The control apparatus as claimed in claim 2, wherein the learning convergence judging section is configured:

to decide that the shift-pressure learning correction has converged, if the convergence determination has been continuously repeated a first number of times when an initial learning convergence decision is conducted, and to decide that the shift-pressure learning correction has converged, if the convergence determination has been continuously repeated a second number of times when a second-time-around or later learning convergence decision is re-conducted in response to prohibition of the torque increase control after an experience of the torque increase control, wherein the second number of times is smaller than the first number of times.

6. A control method for an automatic transmission adapted to achieve a plurality of transmission ratios by changing an engagement state of a friction element in order to transmit torque from a drive source to a drive wheel, the control method comprising:

performing a shift-pressure learning correction in which a physical quantity representing a progress of shift is measured during a current downshift, and in which an engagement command pressure for the friction element is corrected during a next downshift on a basis of a divergence between the measured physical quantity and a target physical quantity;

performing a torque increase control in which a command for temporarily increasing torque of the drive source starts to be outputted when a start estimation timing of torque phase that is preset by a time management has just come during a shift transition period given between a shift start and a shift end of the downshift;

judging on a processor whether or not the shift-pressure learning correction has converged;

prohibiting the torque increase control until it is decided that the shift-pressure learning correction has converged; and permitting the torque increase control when it is decided that the shift pressure learning correction has converged.

7. A control apparatus for an automatic transmission adapted to achieve a plurality of transmission ratios by changing an engagement state of a friction element in order to transmit torque from a drive source to a drive wheel, the control apparatus comprising:

a processor performing a shift-pressure learning correction in which a physical quantity representing a progress of shift is measured during a current downshift, and in which an engagement command pressure for the friction element is corrected during a next downshift on a basis of a divergence between the measured physical quantity and a target physical quantity;

means for performing a torque increase control in which a command for temporarily increasing torque of the drive source starts to be outputted when a start estimation timing of torque phase that is preset by a time management has just come during a shift transition period given between a shift start and a shift end of the downshift;

means for judging whether or not the shift-pressure learning correction has converged;

means for prohibiting the torque increase control until it is decided that the shift-pressure learning correction has converged; and means for permitting the torque increase control when it is decided that the shift-pressure learning correction has converged.

* * * * *